July 2, 1929.    C. J. FRANKS    1,719,540

SAFETY AUTOMOBILE TAG HOLDER

Original Filed March 28, 1927

INVENTOR
Charles J. Franks
By John W. Strehli
ATTORNEY

Patented July 2, 1929.

1,719,540

UNITED STATES PATENT OFFICE.

CHARLES J. FRANKS, OF CINCINNATI, OHIO; IDA B. FRANKS ADMINISTRATRIX OF SAID CHARLES J. FRANKS, DECEASED.

SAFETY AUTOMOBILE TAG HOLDER.

Application filed March 28, 1927, Serial No. 178,930. Renewed May 21, 1929.

The object of my invention is to produce a holder for automobile tags of various sizes, which shall be ornamental and enhance the appearance of the automobile and at the same time act as a signal or warning to oncoming automobiles, coming from either direction, on account of the light of said approaching automobiles being reflected by striking a red colored glass frame which is placed around the edge of the holder and will reflect the danger color of red, and thus warn the approaching automobile. This is true at all times and is especially valuable at night when the lights are out in front or at the rear of the automobile and are also valuable when the automobile is standing still and the lights are out for some reason at either end of the standing automobile.

In the present instance the frame of glass is approximately of a rectangular shape or configuration, but may be of any other formation. The glass used in the present instance is of a semi-circular shape and its surface is of a multiple diamond shape, but may be of any other shape than herein shown and described.

The various features and advantages of the invention will readily become apparent from a perusal of the following specification.

In the accompanying drawing, forming part of this specification—

Figure 1:
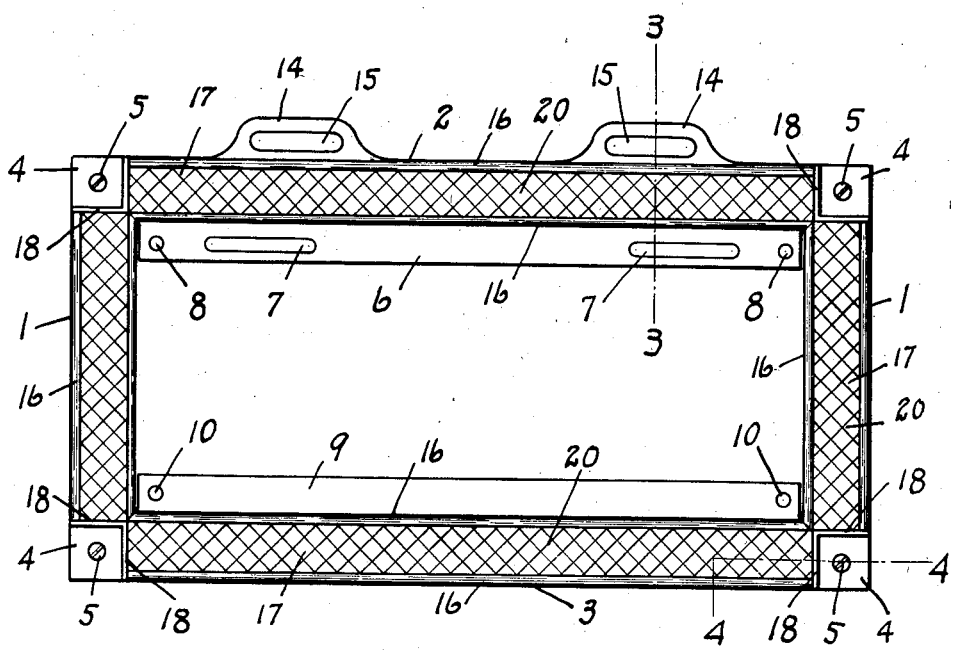
Fig. 1, is a front view of my new invention.
Figure 2:
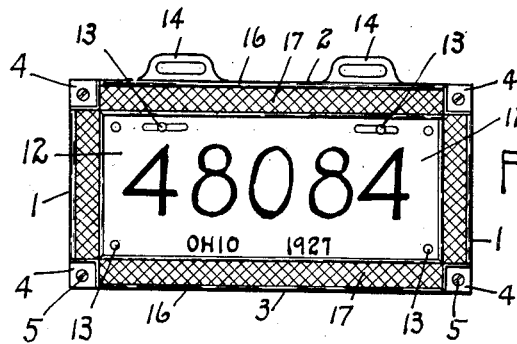
Fig. 2, is a view similar to Fig. 1, except it has a license tag plate in position.
Figure 3:
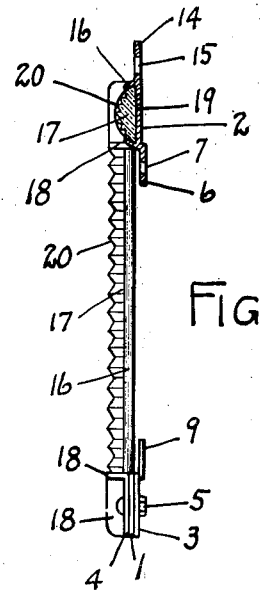
Fig. 3, is an end view and partial section taken on line 3—3 of Fig. 1, and Fig. 4, is a section taken on line 4—4 of Fig. 1.
Figure 4:
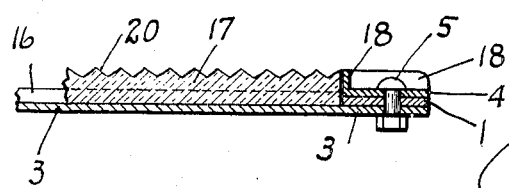

The tag holder is made up of two end plates 1, 1, and an upper plate 2 and a lower plate 3. The end plates 1, 1, lie on top of the upper and lower plates 2 and 3, and are held in squared position by corner plates 4, by the bolt and nut connections 5 passing through the corner plates and the end plates and upper and lower plates.

The upper plate 2 has a lip 6, said lip being provided with slots 7 and bolt holes 8 and the lower plate 3 is provided with a lip 9 having bolt holes 10; the license plate 12 rests on the lips 2 and 9 and is held thereon by bolts 13 which may either pass through the holes 8 or the slots 7 to suit the holes in the license plate. The plate 2 also has the lips 14 which are provided with slots 15 and are used to fasten the plate holder to the automobile, the lates 1, 2 and 3 are provided with turned up edges 16 which are of a curved shape to prevent the glass plates 17 from being dislodged.

The glass plates 17 are inserted endwise under the lips 16 and are held against displacement endwise by the ledges or lips 18 of the corner plates 4.

The surface 19 of the plates 1, 1, 2 and 3 is polished to form a reflection for the glass plates 17 and these plates 17 are semi-circular at their outer face 20 which are of a diagonal squared or diamond shaped surface, so that any light shining upon said surfaces 20 will be reflected from any angle.

These glass plates 17 are made of a colored material usually red and serve as a warning to any approaching automobile, especially during night driving when headlights are turned on.

This signal or warning is always normal and will not get out of order as the red glass frame is ever in working condition.

By my arrangement of the various parts it will be seen that no dust, dirt, rain or the like can get back of the glass and corners and interfere with the proper working of the signal.

It will be readily understood that I may modify and change the safety holder to some extent without departing from the principle of the invention and I wish to be understood as claiming any such changes or modifications which will fall within the scope of this invention.

What I claim as new and my invention and desire to secure by Letters Patent is:—

1. A safety tag holder comprising a frame made up of bars, forwardly extending lips carried by the bars, reflecting plates slidably mounted on the bars and having their edge portions engaged by said lips, and corner elements detachably connected to the corners of the frame and engaging the ends of said plates to lock the plates in position.

2. A safety tag holder comprising a frame made up of top and bottom and end bars, forwardly projecting lips carried by the bars, reflector plates slidably mounted on the bars and having their edge portions engaging said lips, corner brackets having forwardly extending flanges engaging the ends of the reflector plates, and means detachably connecting said corner brackets to the frame.

3. A safety tag holder comprising a frame including top, bottom and end bars, flanges, projecting from the top and bottom bars and apertured to receive bolts for securing a license tag to the flanges, each of said bars having a pair of forwardly projecting lips, reflector plates slidably mounted on the bars and engaging said lips, and corner brackets secured to the corners of the frame and having portions abutting against the ends of the reflector plates for securing the latter in position.

4. A safety tag holder comprising a frame, including top, bottom and end bars, one of said bars having a front reflector surface, lips projecting forwardly from the edge portions of the last mentioned bar, a transparent reflector plate slidably mounted on the last mentioned bar and engaging said lips, corner brackets secured to the frame and having abutment surfaces engaging the ends of the reflector plate, one of said corner brackets being detachably secured in position to facilitate the removal of the reflector plate.

In testimony whereof, I affix my signature at the city of Cincinnati, county of Hamilton, and State of Ohio, this 25th day of March, 1927.

CHARLES J. FRANKS.